United States Patent [19]

James

[11] 4,454,563
[45] Jun. 12, 1984

[54] ELECTRICAL CAPACITOR
[75] Inventor: Stephen A. James, Hennepin, Minn.
[73] Assignee: Honeywell Inc., Minneapolis, Minn.
[21] Appl. No.: 398,458
[22] Filed: Jul. 14, 1982
[51] Int. Cl.³ .............................................. H01G 1/14
[52] U.S. Cl. ..................................................... 361/306
[58] Field of Search ................................ 361/306–308, 361/323, 324, 321; 29/25.42

[56] References Cited

U.S. PATENT DOCUMENTS

| | | | |
|---|---|---|---|
| 1,599,853 | 9/1926 | Toelle | 361/308 X |
| 1,890,313 | 12/1932 | Caine | 29/25.42 |
| 1,990,819 | 2/1935 | Danziger | 361/308 |
| 2,653,281 | 9/1953 | Kopinski | 29/25.42 X |
| 2,785,352 | 3/1957 | Netherwood | 361/323 X |
| 2,942,302 | 6/1960 | Beyer | 29/25.42 |
| 3,156,854 | 11/1964 | Beyer | 361/323 X |
| 3,163,917 | 1/1965 | Bilsing et al. | 29/25.42 |
| 3,251,115 | 5/1966 | Pfeiffer | 29/25.42 |
| 3,256,472 | 6/1966 | Centurioni | 361/323 X |
| 3,617,832 | 11/1971 | Ito et al. | 361/321 |
| 3,906,297 | 9/1975 | Hunt | 29/25.42 X |
| 4,037,298 | 7/1977 | Flanagan | 29/25.42 |

FOREIGN PATENT DOCUMENTS 1078105  5/1954  France ............................... 361/321

Primary Examiner—Donald A. Griffin
Attorney, Agent, or Firm—George W. Field

[57] ABSTRACT

In a wound capacitor, in combination: a capacitance roll including electrodes spaced by dielectric layers, the electrodes projecting separately to opposite ends of the roll; a pair of discs at the ends of the roll and shaped to conform with the ends of the roll, each disc having a first, roughened surface for intimately engaging the electrode at the end of the roll, and having a conductor extending generally axially away from a second surface thereof, each conductor having an offset spaced from the disc, and structure maintaining the discs in contact with the ends of the roll.

1 Claim, 2 Drawing Figures

ELECTRICAL CAPACITOR

TECHNICAL FIELD

This invention relates to the field of electrical engineering, and particularly to the design of wound electrical capacitors.

BACKGROUND OF THE INVENTION

It is well known to construct electrical capacitors by winding on a mandrel a roll comprising layers of dielectric material separating layers of electrical conductors which comprise the electrodes of the capacitor. The winding is formed so that one electrode projects to the edge of the roll only at the other end. After the roll is secured with an outer tape, it is removed from the mandrel: connections must now be made to the electrodes.

Heretofore there has been no completely satisfactory way of making connections to the electrodes which will give continuous, reliable service through repeated temperature changes and regardless of the mechanical vibration such components must undergo in service.

BRIEF SUMMARY OF THE INVENTION

The present invention comprises an arrangement by which reliable connections are made to the electrodes of the capacitor by the use of discs carrying conductors or leads and having spiked or roughened surfaces for engaging the electrodes, the assembly being completed by a fastener passing through the mandrel hole in the capacitor roll or section.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
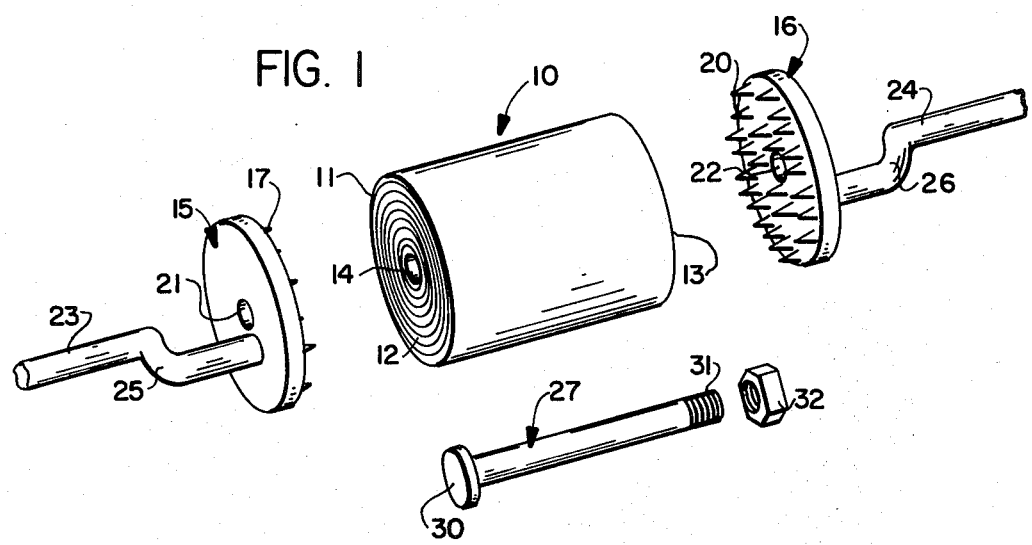
FIG. 1 is an exploded view of a capacitor according to the invention while being assembled.

Turning now to FIG. 1, a capacitor roll or "section" 10 comprises first and second thin helical electrodes spaced by dielectric layers and secured by a wrapping of tape 11. As is customary, one of the electrodes projects to a first end 12 of the roll, and the other electrode similarly projects to the opposite end 13 of the roll. A hole 14 extends axially through the roll, from which the usual winding mandrel has been withdrawn.

Electrical connections must now be made to the electrodes of the capacitor. This is done by a pair of discs 15 and 16 having roughened or spiked surfaces 17 and 20 shaped to conform with the ends of roll 10 and having central apertures 21 and 22. Leads 23 and 24 are welded or otherwise secured to second surfaces of discs 15 and 16, and include strain relief offsets 25 and 26 near the discs. A plastic fastener or bolt 27 sized to pass through hole 14 and apertures 21 and 22 has a head 30 at one end and threads 31 at the other end to receive a plastic nut 32.

To complete the capacitor, discs 15 and 16 are pressed firmly against the ends of the section, so that spikes 17 engage one electrode and spikes 20 engage the other electrode. Fastener 27 is passed through the discs and the section, and nut 32 is tightened and may be secured with cement 33.

Figure 2:
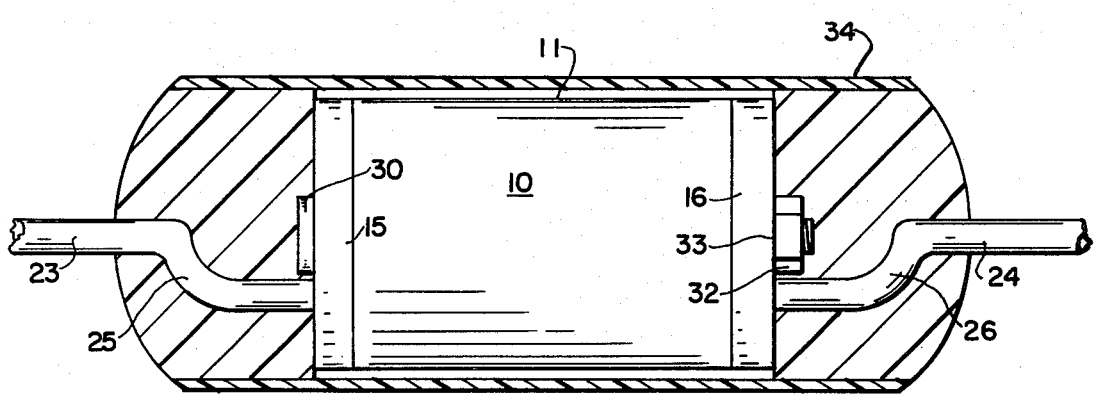
FIG. 2 is a view generally in longitudinal section of the capacitor after assembly.

The capacitor may now be completed in the usual "wrap and fill" process, (see FIG. 2) by passing a further tape 34, wider than the length of the section therearound, and filling the end spaces so defined with a suitable insulating and sealing compound.

The capacitor is also adapted for hermetic sealing in metal containers by well known procedures: if this is done, fastener 27 is preferably of type 610 nylon, 40% glass filled, to have a thermal coefficient of expansion which will match that of the container.

The invention described above is particularly well adapted for use of capacitors of comparatively large diameter, a quarter of an inch or larger, for example. Discs 15 and 16 are conveniently made by casting from a metal such as copper, and are then tinned, for improved electrical contact with the electrodes to be engaged by the roughened surfaces.

From the above it will be evident that the invention comprises a capacitor structure in which connection is made to the electrodes in a simple, mechanically reliable manner so that the leads remain firmly secured in the capacitor and permanently in electrical connection with the electrodes.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. A wound capacitor comprising, in combination:
    a helical capacitance roll having a mandrel hole extending axially therethrough and including electrodes spaced by dielectric layers, the electrodes projecting separately to opposite ends of the roll;
    a pair of connecting discs at the ends of said roll having axial apertures and shaped to conform with said ends of said roll, each said disc having a first, roughened surface intimately engaging the electrode at an end of said roll, and having a conductor extending away from a site on a second surface thereof radially outward of said axis;
    a rigid plastic fastener passing through said apertures and said hole from a head at one end to a nut threaded on the other end thereof to form a unitary assembly;
    and protective means enclosing said assembly with said conductors extending therefrom at opposite ends thereof.

* * * * *